Oct. 7, 1924.

W. K. McNEILL 1,511,130

WHEEL RETAINER

Filed Aug. 11, 1923      2 Sheets-Sheet 1

William K. McNeill
INVENTOR

BY Victor J. Evans
ATTORNEY

WITNESS:

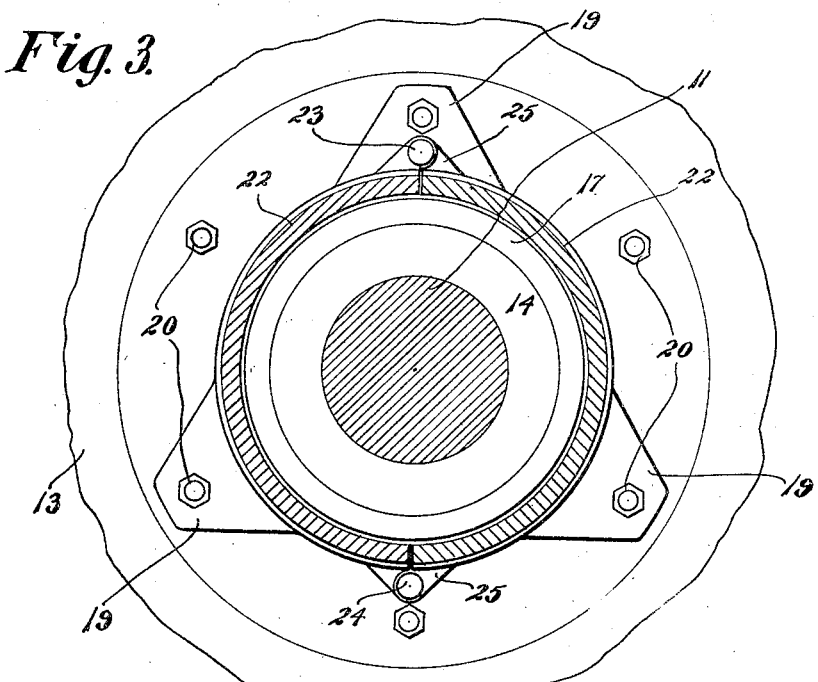
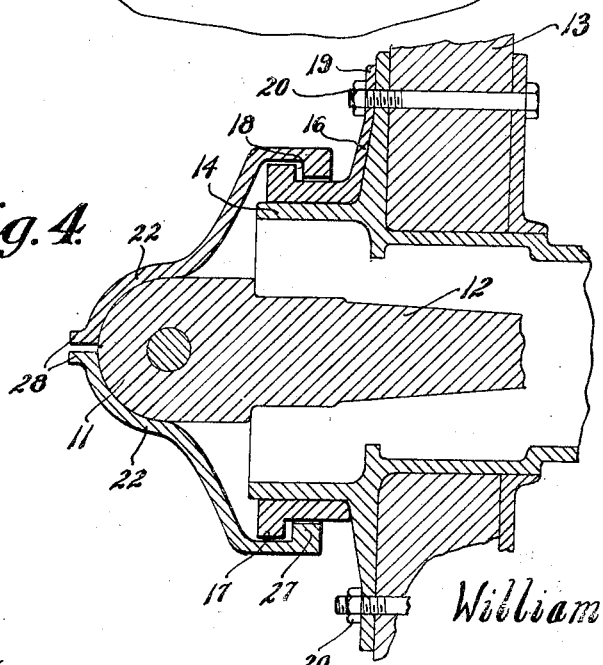

Patented Oct. 7, 1924.

1,511,130

UNITED STATES PATENT OFFICE.

WILLIAM KOY McNEILL, OF HAMLET, NORTH CAROLINA.

WHEEL RETAINER.

Application filed August 11, 1923. Serial No. 656,970.

*To all whom it may concern:*

Be it known that I, WILLIAM KOY MCNEILL, a citizen of the United States, residing at Hamlet, in the county of Richmond and State of North Carolina, have invented new and useful Improvements in Wheel Retainers, of which the following is a specification.

This invention relates to improvements in automobiles and has for an object the provision of a wheel retainer which may be secured in place for the purpose of preventing the wheels from leaving the axle spindles in the event of the usual securing means becoming useless or ineffective.

Another object of the invention is the provision of means of the above stated character which may be easily and quickly applied, will provide for the exclusion of dust and dirt from the hub and will not interfere with the proper running of the wheels.

With the above and other objects in view, the invention further includes the following novel features and details of construction, to be hereinafter more fully described, illustrated in the accompanying drawings and pointed out in the appended claims.

In the drawings:—

Figure 3 is a section on the line 3—3 of Figure 1, looking in the direction of the arrow.

Figure 4 is a section on the line 4—4 of Figure 1.

Figure 1:
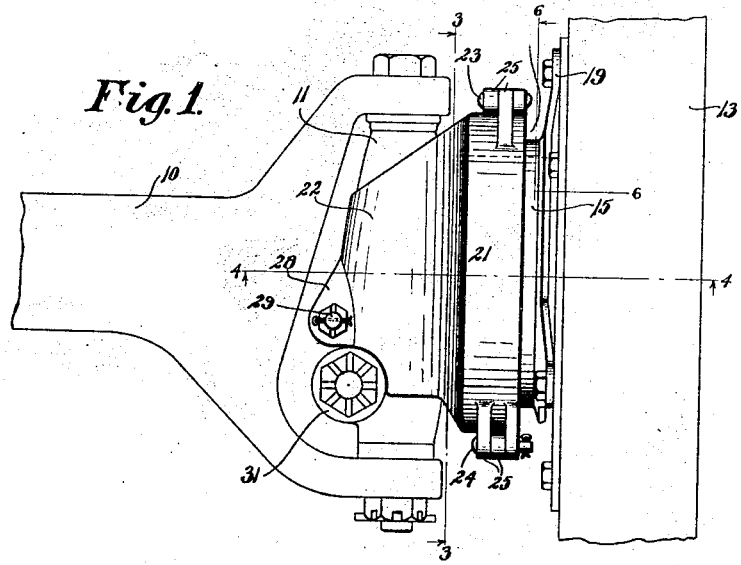
Figure 1 is a fragmentary elevation illustrating the application of the invention.
Figure 2:
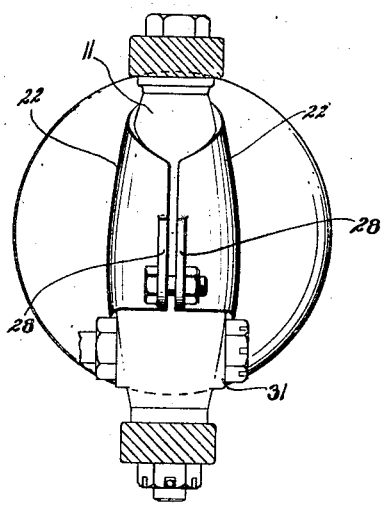
Figure 2 is an end view of the device as shown in Fig. 1.
Figure 5:
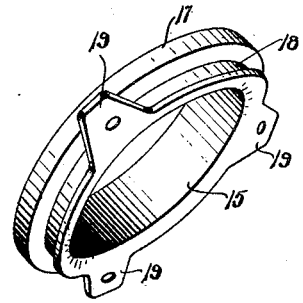
Figure 5 is a detail perspective view of the channeled wheel cuff.
Figure 6:
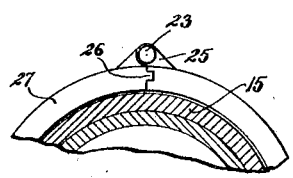
Figure 6 is a detail section on the line 6—6 of Figure 1.

Referring in detail to the drawings wherein like characters of reference denote corresponding parts, the reference character 10 indicates a portion of the front axle of an automobile, 11 the steering knuckle post, 12 the spindle, 13 a portion of one of the wheels of the automobile and 14 a portion of the wheel hub.

The invention which is designed to retain the wheel in place and to provide a dust housing or protector for the inner end of the hub, includes an annular member or cuff 15 which is provided with annular flanges 16 and 17, the said flanges defining opposite walls of an annular channel 18. The flange 16 has extending therefrom radially disposed apertured ears 19 which are adapted to receive the hub bolts 20 to provide means for securing the cuff to the wheel over the inner end of the hub.

The reference character 21 indicates a connecting member or housing which is formed of a pair of substantially complemental members 22. These members are hingedly connected together by means of a pivot pin 23 and have their opposite ends detachably connected by means of a removable bolt 24, the said pin and bolt passing through overlapping apertured ears 25 provided at the meeting edges of the members 22.

When connected together the members 22 provide a casing having at one end an annular inwardly extending flange 27 which enters the channel 18 of the cuff 15. The meeting edges of the flange 27 are provided with interengaging tongues and grooves 26 to prevent relative movement of the sections 22. This flange 27 is located at one end of a housing 21, while the opposite end of the housing is shaped to receive the spindle body 11. This end of the housing is provided with apertured ears 28 which receive a bolt 29, the said bolt being preferably held in place by means of a castellated nut and cotter pin. The spindle body receiving end of the housing 21 is cut away as at 30 to accommodate the spindle arm 31.

It will be apparent from the foregoing description and accompanying drawings that the invention provides a device which may be attached to an automobile to securely retain the wheels upon the axle spindles and prevent the entrance of dust or dirt into the hubs through their inner ends. The retainer will therefore act to minimize the danger of accident due to faulty wheel retaining means and will increase the life of the wheel bearings by the exclusion of dust and dirt.

The invention is susceptible of various changes in its form, proportions and minor details of construction and the right is herein reserved to make such changes as properly fall within the scope of the appended claims.

Having described the invention what is claimed is:—

1. A wheel retainer comprising a member to be secured to the wheel hub of the automobile and provided with an annular channel, a hingedly connected sectional member secured to the steering knuckle post and extending within the container to hold the wheel upon the hub and a clamp carried by the sectional member for engagement around the spindle body.

2. A wheel retainer comprising a member to be secured to the wheel hub of the automobile and provided with an annular channel, a sectional casing, means for securing the sections together within the channel and means for securing said sections together around the steering knuckle post.

In testimony whereof I affix my signature.

WILLIAM KOY McNEILL.